United States Patent
Soma et al.

(10) Patent No.: US 6,501,813 B1
(45) Date of Patent: *Dec. 31, 2002

(54) CONTROL ROD/FUEL SUPPORT GRAPPLE

(75) Inventors: Koichi Soma, Yokohama (JP); Kazuo Sakamaki, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,594

(22) Filed: Jun. 11, 1998

(30) Foreign Application Priority Data

Jun. 11, 1997 (JP) .............................. 9-153404

(51) Int. Cl.[7] .............................. G21C 19/10
(52) U.S. Cl. ...................... 376/262; 376/260; 376/264; 376/266
(58) Field of Search ................ 376/260, 262, 376/264, 266, 219, 223, 231, 233

(56) References Cited

U.S. PATENT DOCUMENTS

| 3,933,581 | A | * | 1/1976 | McKeehan et al. | ....... 176/36 R |
| 3,990,591 | A | * | 11/1976 | Street et al. | .................. 214/87 |
| 4,107,747 | A | * | 8/1978 | Kumaki | ...................... 360/93 |
| 4,769,208 | A | * | 9/1988 | Germer | ....................... 376/336 |
| 5,331,675 | A | * | 7/1994 | Hosoya et al. | ............... 376/260 |
| 5,377,239 | A | * | 12/1994 | Nopwaskey et al. | ........ 376/260 |
| 5,426,680 | A | * | 6/1995 | Willems | ...................... 376/258 |
| 5,473,645 | A | | 12/1995 | Kowdley | ...................... 376/262 |
| 5,521,950 | A | | 5/1996 | Whitling | ..................... 376/260 |
| 5,592,520 | A | * | 1/1997 | Ledford et al. | ............. 376/233 |
| 6,047,037 | A | * | 4/2000 | Wivagg | ...................... 376/260 |

FOREIGN PATENT DOCUMENTS

| JP | 60-39834 | * | 6/1982 | ................. 376/262 |
| JP | 61-239195 | * | 10/1986 | ................. 376/260 |
| JP | 63-295996 | * | 12/1988 | ................. 376/262 |
| JP | 03-033693 | * | 2/1991 | ................. 376/327 |
| JP | 7-72289 | | 3/1995 | |
| JP | 09-325197 | * | 12/1997 | |

* cited by examiner

*Primary Examiner*—Michael J. Carone
*Assistant Examiner*—Jack Keith
(74) *Attorney, Agent, or Firm*—Foley & Lardner (57) ABSTRACT

A control rod/fuel support grapple is provided which is capable of pulling up simultaneously a control rod and a fuel support from a reactor and also uncoupling the control rod and control rod drive mechanism. The control rod/fuel support grapple comprises a control rod holding unit for holding a control rod's hoist handle, a fuel support holding unit for holding a fuel support, and a coupling releasing unit or uncoupling the control rod and the control rod drive mechanism, coupled by virtue of a spud coupling. These three units are attached to a main body frame which is lowered into a reactor pressure vessel.

13 Claims, 10 Drawing Sheets

# CONTROL ROD/FUEL SUPPORT GRAPPLE

BACKGROUND OF THE INVENTION

1. Field of the Invention

The present invention relates to a control rod/fuel support grapple and, more particularly, a control rod/fuel support grapple which is capable of picking up simultaneously control rods and a fuel support in a boiling water reactor (referred to as a "BWR" hereinafter).

2. Description of the Related Art

Figure 8:
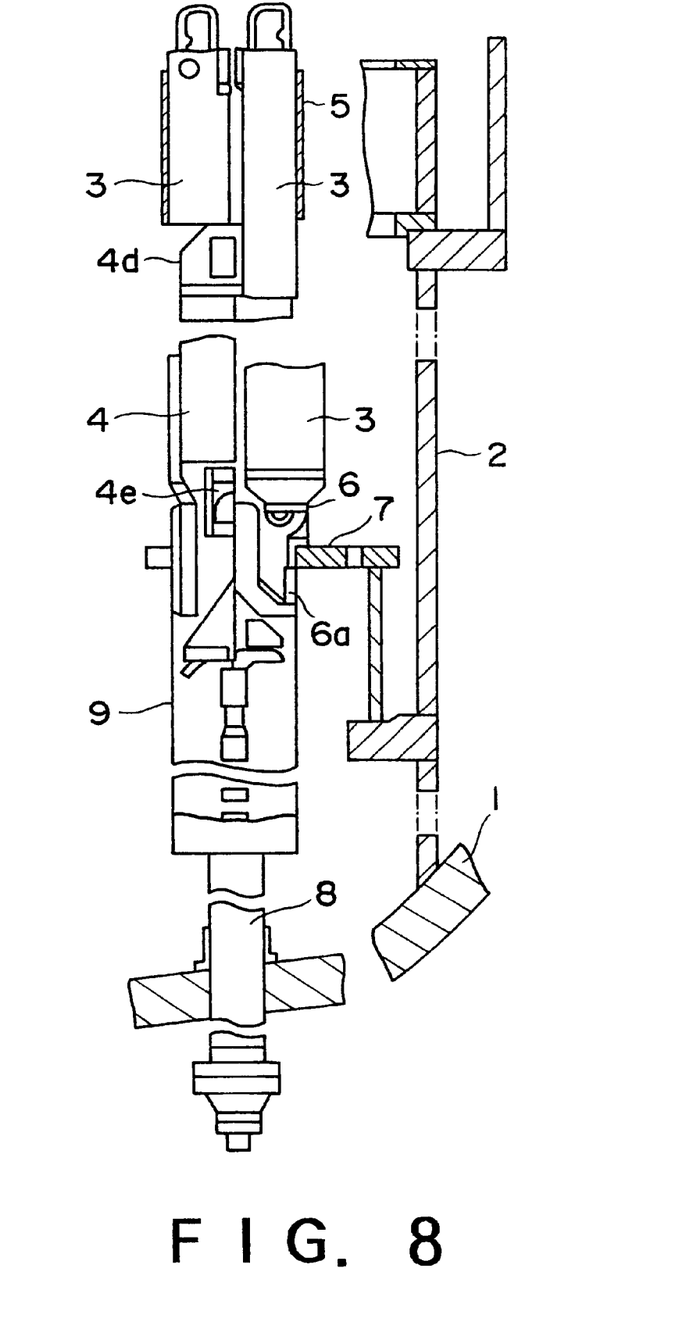
FIG. 8 is a vertical sectional view showing a part of the core of the BWR.

FIG. 8 is a vertical sectional view showing a part of the core of the BWR. As shown in FIG. 8, a cylindrical core shroud 2 is provided in an inside of a reactor pressure vessel 1 and a plurality of fuel assemblies 3 are loaded in the core shroud 2. A plurality of control rods 4 each having a cruciform lateral sectional shape are arranged vertically movable in clearances between the fuel assemblies 3. Each of the control rods 4 has a hoist handle 4d at its top end. Core reactivity can be controlled by moving up and down these control rods 4 in the core.

Figure 9:
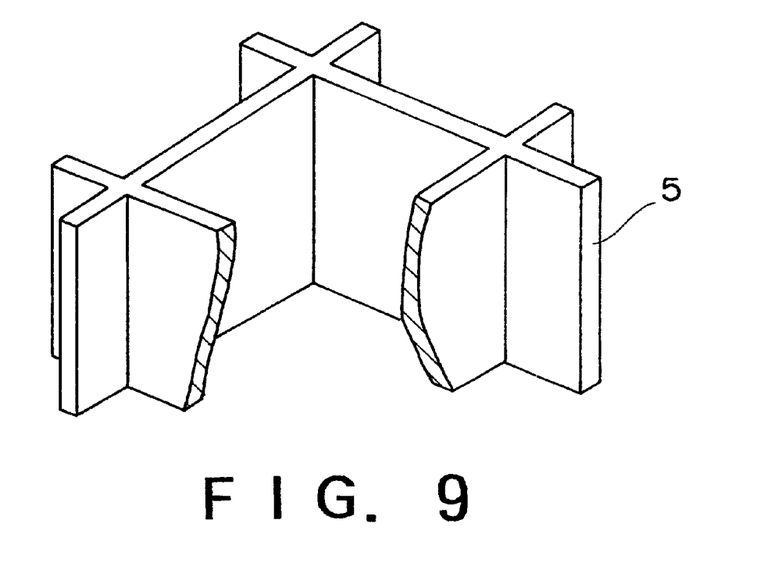
FIG. 9 is a perspective view showing a part of an upper grid of the BWR.

A top end of the fuel assembly 3 is supported by an upper grid 5. A bottom end of the fuel assembly 3 is supported by a core support plate 7 via a fuel support 6. FIG. 9 is a perspective view showing a part of the upper grid 5 of the BWR. As shown in FIG. 9, a plurality of grids into which the top ends of a plurality of fuel assemblies 3 are inserted respectively are formed on the upper grid 5.

Figure 10:
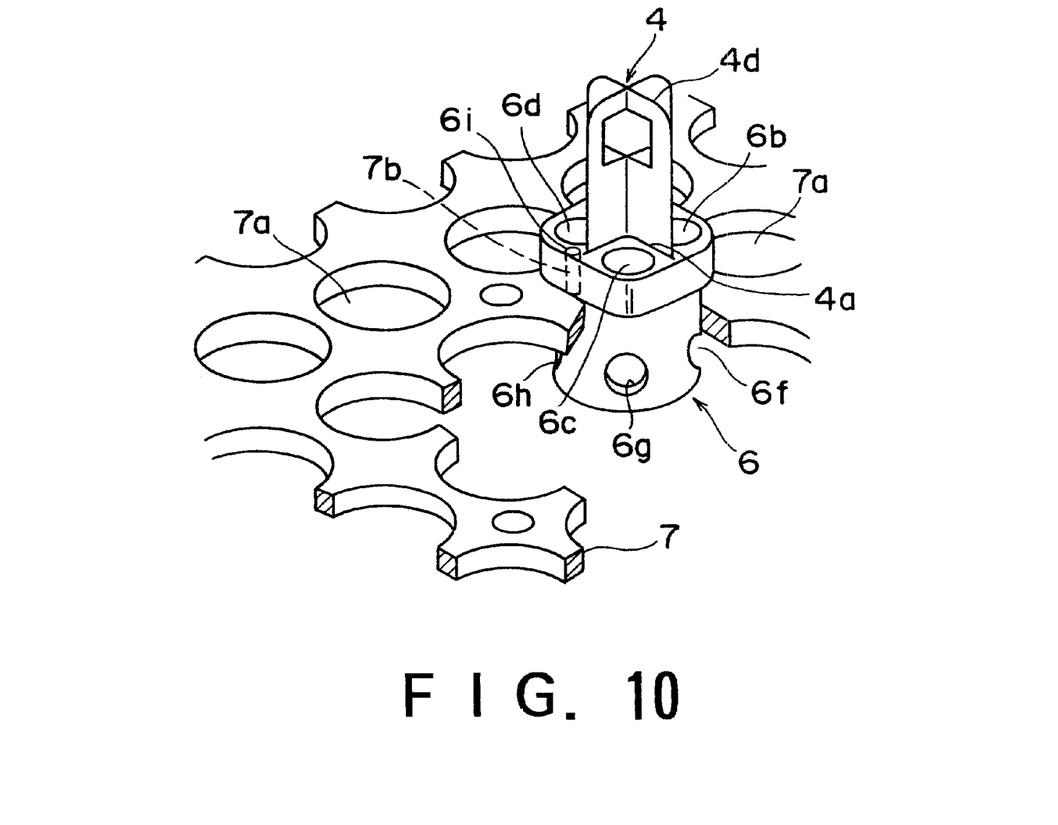
FIG. 10 is a perspective view showing the fuel support arranged in a core support plate of the BWR and the control rod inserted into the fuel support.
Figure 11:
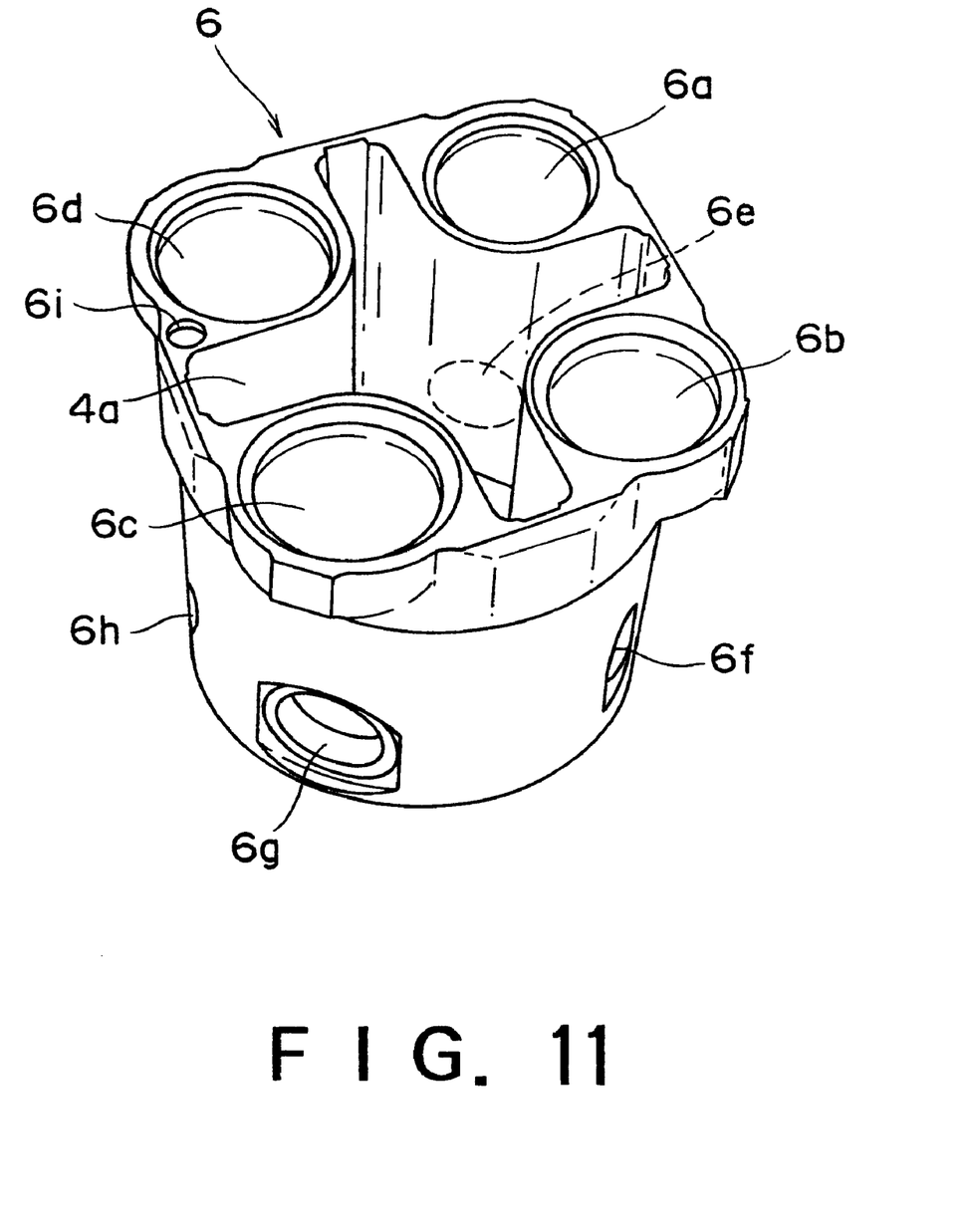
FIG. 11 is a perspective view showing the fuel support of the BWR.

As shown in FIG. 10, a plurality of fuel support sustaining holes 7a are formed in the core support plate 7, and the fuel supports 6 can be supported by the core support plate 7 by inserting their cylindrical bottom portions into the sustaining holes 7a respectively. As shown in FIG. 11, for example, sustaining holes 6a, 6b, 6c, 6d and a cruciform shaped through hole 4a are formed on a substantially square cylinder type upper surface portion of the fuel support 6. Then, bottom portions of four fuel assemblies 3 can be inserted into the sustaining holes 6a, 6b, 6c, 6d respectively and then supported thereon. The cruciform control rod 4 can be moved vertically through the cruciform through hole 4a.

The sustaining holes 6a, 6b, 6c, 6d of the fuel support 6 are connected to orifices 6e, 6f, 6g, 6h formed on a side peripheral wall of the fuel support 6 respectively such that coolant is supplied from the orifices 6e, 6f, 6g, 6h to the fuel assemblies 3 via the sustaining holes 6a, 6b, 6c, 6d respectively. In addition, a slot 6i into which a fixing pin 7b (provided on the core support plate 7) is inserted is formed on an upper corner portion of the fuel support 6. The fuel support 6 can be fixed to the core support plate 7 via the slot 6i.

Also, as shown in FIG. 8, a plurality of control rod drive mechanisms (CRDs) 8 are provided so as to pass through a bottom portion of the reactor pressure vessel 1 vertically. The control rods 4 are detachably attached to the control rod drive mechanisms 8 respectively. Top ends of a plurality of control rod guide tubes 9 are coupled to the core support plate 7. The fuel supports 6 are arranged on the top ends of the control rod guide tubes 9 respectively. The control rod 4 can be driven vertically by the control rod drive mechanism 8 such that the control rod 4 can be inserted into or withdrawn from the core through the inside of the control rod guide tube 9 and the cruciform through hole 4a of the fuel support 6.

Figure 12:
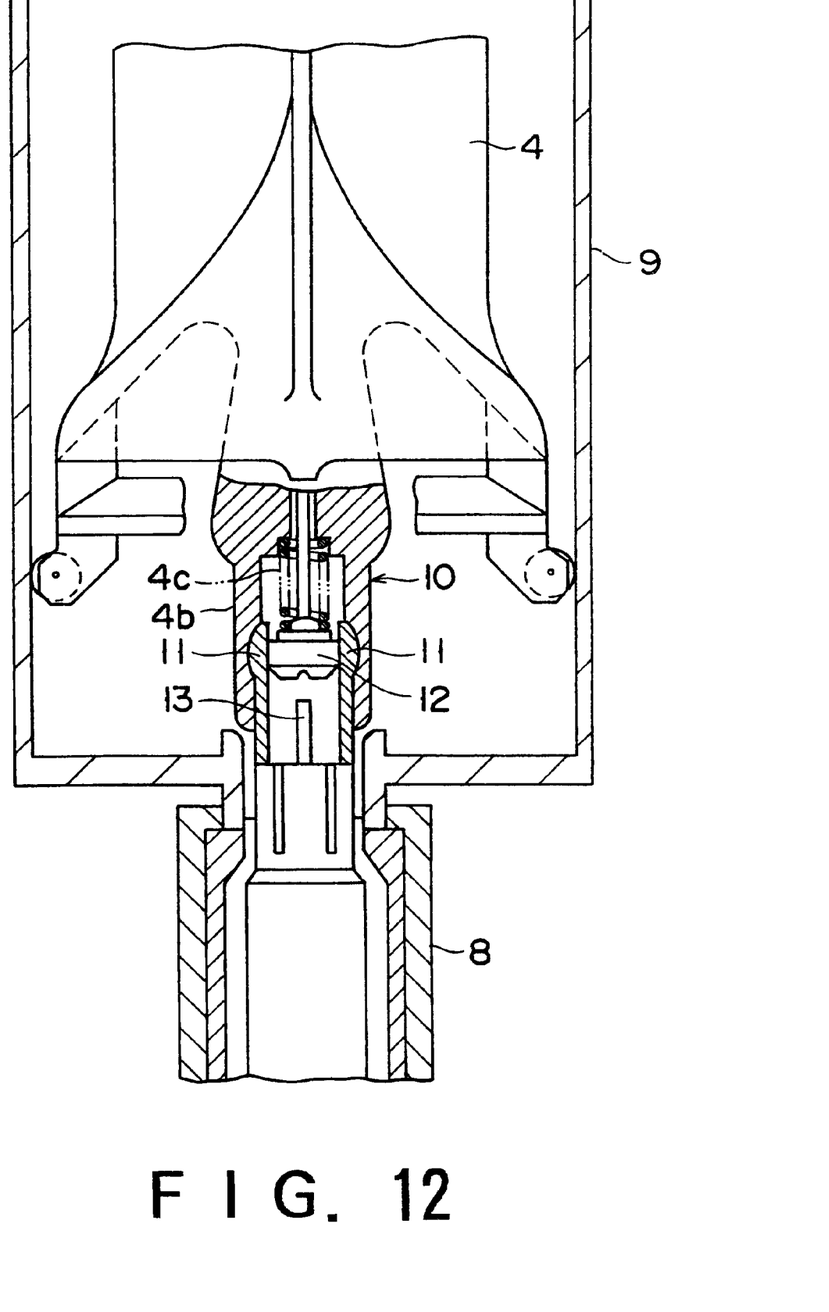
FIG. 12 is a partial vertical sectional view showing a coupled state of the control rod and the control rod drive mechanism of the BWR by using a spud coupling.

As shown in FIG. 12, the control rod 4 and the control rod drive mechanism 8 are coupled with each other by a spud coupling type coupling mechanism. More particularly, they are coupled via a spud coupling 10. A coupling spud 11 whose periphery is divided by cuttings to form quartered latching pawls, for example, is pushed upward by a drive piston (not shown) of the control rod drive mechanism 8. The coupling spud 11 can be tightly pushed into a clearance formed on the out side of a periphery of a lock plug 12 which is inserted into the fitting holes of a lower end 4b of the control rod 4. As a result, the coupling spud 11 is supported by both an inner peripheral surface of the lower end 4b of the control rod 4 and an outer peripheral surface of the lock plug 12, so that the control rod 4 and the control rod drive mechanism 8 can be coupled with each other.

There are two methods of uncoupling the control rod 4 and the control rod drive mechanism 8, i.e., one is such a method that can be applied from a pedestal side of the bottom portion of the reactor and the other is such a method that can be applied from an upper side of the reactor. In the event that the releasing operation is applied from the pedestal side of the bottom portion of the reactor, as shown in FIG. 12, the lock plug 12 is pushed upward by an uncoupling rod 13 of the control rod drive mechanism 8 against a spring force of a spring 4c, whereby a coupled state of the control rod 4 and the control rod drive mechanism 8 are uncoupled.

In turn, in the event that a releasing operation is applied from the upper side of the reactor, at first the fuel assembly 3 is pulled up from the core. Then, the fuel support 6 can be pulled up from the core by means of a manipulating tool which can manipulate the fuel support 6. Then, the manipulating tool can be replaced with a dedicated control rod latch tool which can hold the control rod 4 and then release the control rod 4 and the control rod drive mechanism 8. They can be released by operating a release handle 20 (latching handle) 4e (see FIG. 8) of the control rod 4 by use of this control rod latch tool, and thereafter the control rods 4 can be pulled up from the core.

At any rate, during a periodical inspection of the BWR, both reduction in working time and reduction in operator's exposure are desired. An exchange operation of the control rods 4 is not an exception.

In the related art, in order to reduce a time required for the exchange operation of the control rods, at first an uncoupling operation (coupling releasing operation) of the control rod and the control rod drive mechanism is carried out from the pedestal side of the bottom portion of the reactor by using the control rod drive mechanism, and then the control rods and the fuel support are picked up simultaneously from the core from the upper side of the reactor by using the conventional control rod/fuel support grapple, whereby the exchange operation of the control rods is performed.

However, as described above, in the exchange operation of the control rods by use of the control rod/fuel support grapple method in the related art, since at first the uncoupling operation of the control rod and the control rod drive mechanism has been carried out from the pedestal side of the lower portion of the reactor by using the control rod drive mechanism and then the control rods and the fuel support have been picked up from the core simultaneously from the upper side of the reactor by using the conventional control rod/fuel support grapple, two stage operations have been required which causes a longer working term.

In addition, in the event that the uncoupling operation of the control rod and the control rod drive mechanism is applied from the pedestal side of the bottom portion of the reactor, there has been a problem of the operator's exposure in the related art. For this reason, it has been requested that the operator's exposure would be reduced by executing the exchange operation of the control rods without the operation conducted at the bottom portion of the reactor.

SUMMARY OF THE INVENTION

Therefore, it is an object of the present invention to provide a control rod/fuel support grapple (abbreviated as a "CR/FS grapple" hereinafter) which is capable of pulling up simultaneously control rods and a fuel support and also carrying out an uncoupling operation of the control rod and a control rod drive mechanism.

In order to achieve the above object, according to the present invention, there is provided a control rod/fuel support grapple comprising a control rod holding means for holding a hoist handle provided to a top end of a control rod, a fuel support holding means for holding a fuel support which supports a bottom end of a fuel assembly, a coupling releasing means for releasing a coupled state between the control rod and a control rod drive mechanism by virtue of spud coupling, and a main body frame to which the control rod holding means, the fuel support holding means, and the coupling releasing means are attached and which can be hung down into an inside of a reactor pressure vessel.

Preferably, the coupling releasing means includes a coupling releasing link mechanism for operating a control rod's release handle, and a coupling releasing cylinder for driving the coupling releasing link mechanism.

Still preferably, the control rod holding means can be displaced relative to the main body frame along a longitudinal direction of the control rod by a predetermined width.

Still preferably, the control rod/fuel support grapple further comprises an operational timing control mechanism for releasing a coupled state between the control rod and the control rod drive mechanism by using the coupling releasing means after the hoist handle being held by the control rod holding means.

Still preferably, the control rod holding means includes a pivotable hook adapted to be hooked onto the hoist handle, and a control rod holding cylinder for carrying out a pivot operation of the pivotable hook.

Still preferably, the coupling releasing means includes a coupling releasing link mechanism for operating a control rod's release handle, and a coupling releasing cylinder for driving the coupling releasing link mechanism, the control rod holding cylinder and the coupling releasing cylinder are driven by a common working fluid source, and the operational timing control mechanism is such a mechanism that can reduce an operation speed of the coupling releasing cylinder to be smaller than an operation speed of the control rod holding cylinder.

Still preferably, the operational timing control mechanism is composed of a damper mechanism for applying resistance to a piston rod of the coupling releasing cylinder in its operation.

Still preferably, the operational timing control mechanism is composed of a flow restrict mechanism which is provided in a middle of an working fluid pipe connected to the coupling releasing cylinder.

Still preferably, the hook is formed of a hook-shaped member, and a self-weight of the control rod operates to hold a hooked state of the hoist handle by the hook after the control rod has been lifted up via the hook.

Still preferably, the fuel support holding means includes a fuel support holding link mechanism for holding a top end of an orifice of the fuel support, and a fuel support holding cylinder for driving the fuel support holding link mechanism.

Still preferably, the fuel support holding link mechanism has contact a back-and-forth movable piece adapted to be connected to the top end of the orifice, and a stepped portion on which the upper portion of the orifice is placed being formed on the contact piece such that back and forth motions of the contact piece can be inhibited in a state that the upper portion of the orifice is placed on the stepped portion.

Still preferably, the control rod/fuel support grapple further comprises a detecting means for checking a holding state of the control rod holding means, a holding state of the fuel support holding means, and a releasing state of the coupling releasing means respectively.

Still preferably, the control rod holding means and the coupling releasing means are detachably attached to the main body frame, the fuel support holding means and both the control rod holding means and the coupling releasing means can be employed independently respectively as separate bodies by detaching the control rod holding means and the coupling releasing means from the main body frame.

DETAILED DESCRIPTION OF THE PREFERRED EMBODIMENTS

A CR/FS grapple according to an embodiment of the present invention will be explained in detail with reference to the accompanying drawings hereinafter.

The CR/FS grapple according to one embodiment of the resent invention is employed such that, when a periodical inspection of the BWR, etc. is conducted, the CR/FS grapple is hung down into a reactor pressure vessel 1 (see FIG. 8) so as to release control rods 4 and a fuel support 6 from a core and, in turn, install the control rods 4 and the fuel support 6 from a fuel storage pool outside the reactor pressure vessel into the core.

Figure 1:
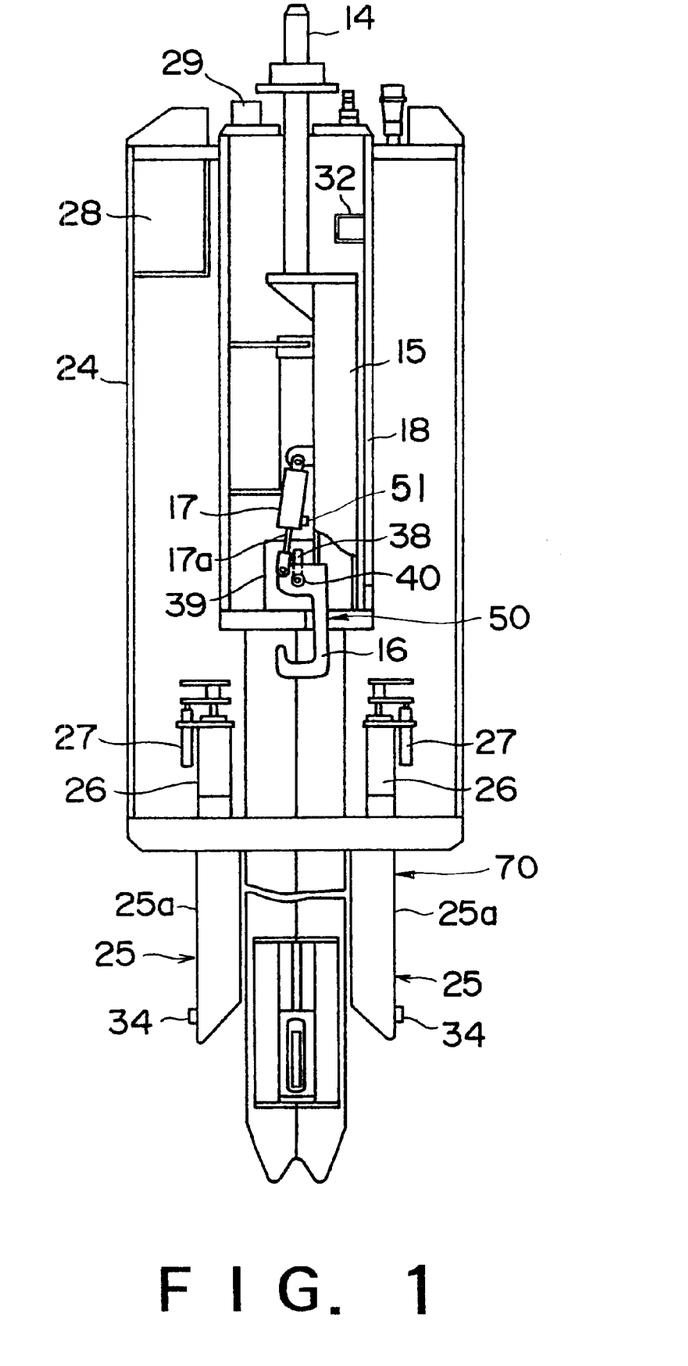
FIG. 1 is a front vertical sectional view showing a schematic configuration of a CR/FS grapple according to an embodiment of the present invention.
Figure 2:
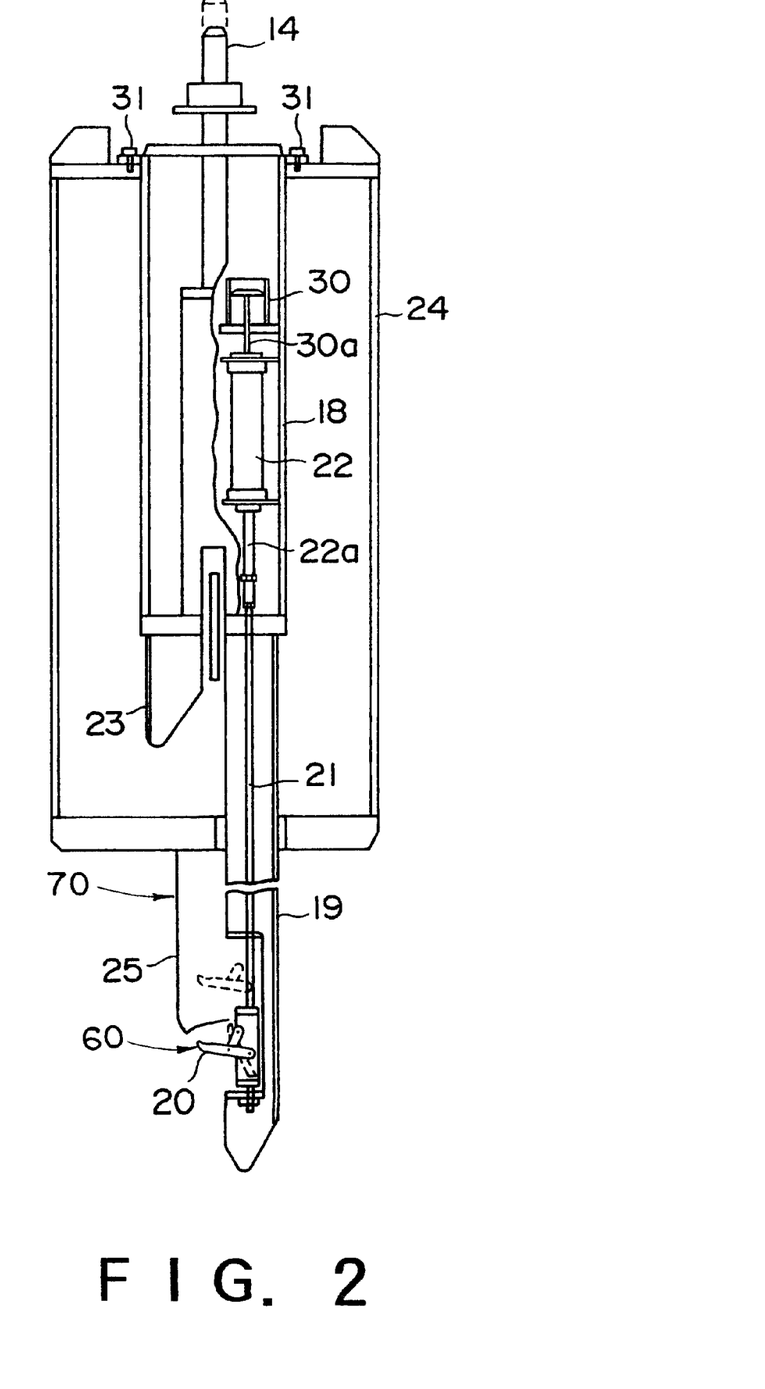
FIG. 2 is a side vertical sectional view showing the schematic configuration of the CR/FS grapple according to the embodiment of the present invention.

FIGS. 1 and 2 are vertical sectional views showing a schematic configuration of the CR/FS grapple according to the embodiment of the present invention. FIG. 1 is a front vertical sectional view while FIG. 2 is a side vertical sectional view. As shown in FIGS. 1 and 2, the CR/FS grapple according to the embodiment of the present invention comprises a main body frame 24 to which a separating frame 18 is fitted attachably/detachably by fitting bolts 31. A guide member 23 is provided at a lower end of the separating frame 18 to guide a hoist handle 4d (see FIG. 8) of the control rod 4.

A square cylinder member 15 is provided in an inside of the separating frame 18 to be moved vertically by a predetermined width, but an upward movement of the square cylinder member 15 can be limited by a stopper 32 which is projected from an inner surface of the separating frame 18. A stud 14 is secured to an top end of the square cylinder member 15. The stud 14 is formed to have a square cylinder shape because a grid guide (not shown) which can guide the CR/FS grapple in passing through the upper grid 5 (see FIG. 8) can be attached to the stud 14. The stud 14 is connected to a hoist rope, etc. which is wound on an auxiliary hoist of a refueling machine. The CR/FS grapple can be picked up by the hoist rope, etc. and then inserted into the inside of the reactor pressure vessel 1 (see FIG. 8).

A control rod holding air cylinder 17 is pivotally coupled to the square cylinder member 15 via a hinged coupling. A hook 16 which is formed of a hook-shaped member is pivotally coupled to a piston rod 17a of the air cylinder 17 via the hinged coupling. A bearing member 39 having a longitudinal hole 38 therein is provided on the separating frame 18. A pivot axis 40 is inserted into the longitudinal hole 38 and is movable vertically. Then, the hook 16 is fitted to the bearing member 39 via the pivot axis 40 such that such hook 16 can be pivoted and moved vertically.

A limit switch 51 is provided in the close vicinity of the air cylinder 17. An operation state of the air cylinder 17 can be detected by the limit switch 51. The limit switch 51 is electrically connected to an indicator lamp 29 which is energized by a battery 28. The result detected by the limit switch 51 can be displayed by the indicator lamp 29. Therefore, the operator can check by eye whether or not the hook 16 is located in a hooking position.

A control rod holding means 50 consists of the square cylinder member 15, the hook 16, and the air cylinder 17. Since the square cylinder member 15 can be moved up and down relative to the separating frame 18 by a predetermined width, the control rod holding means 50 can also be moved up and down relative to the separating frame 18. At that time, because the separating frame 18 is fixed to a main body frame 24, the control rod holding means 50 can be moved vertically relative to the main body frame 24 by a predetermined width, i.e., can be displaced relatively along a longitudinal direction of the control rod 4.

A hoisting stroke of the control rod holding means 50 with respect to the separating frame 18 is designed to exceed a height of a projected portion of the hook 16 such that a mechanical lock mechanism can operate while keeping an engagement of the projection portion formed at the top end of the hook 16 with the hoist handle 4d (see FIG. 8) of the control rod 4.

As shown in FIG. 2, a coupling releasing air cylinder 22 is fixed to the separating frame 18. A piston rod 22a of the coupling releasing air cylinder 22 is connected to a coupling releasing link mechanism 20 via an actuating rod 21. In this manner, the coupling releasing link mechanism 20 can be driven by the coupling releasing air cylinder 22.

Figure 3:
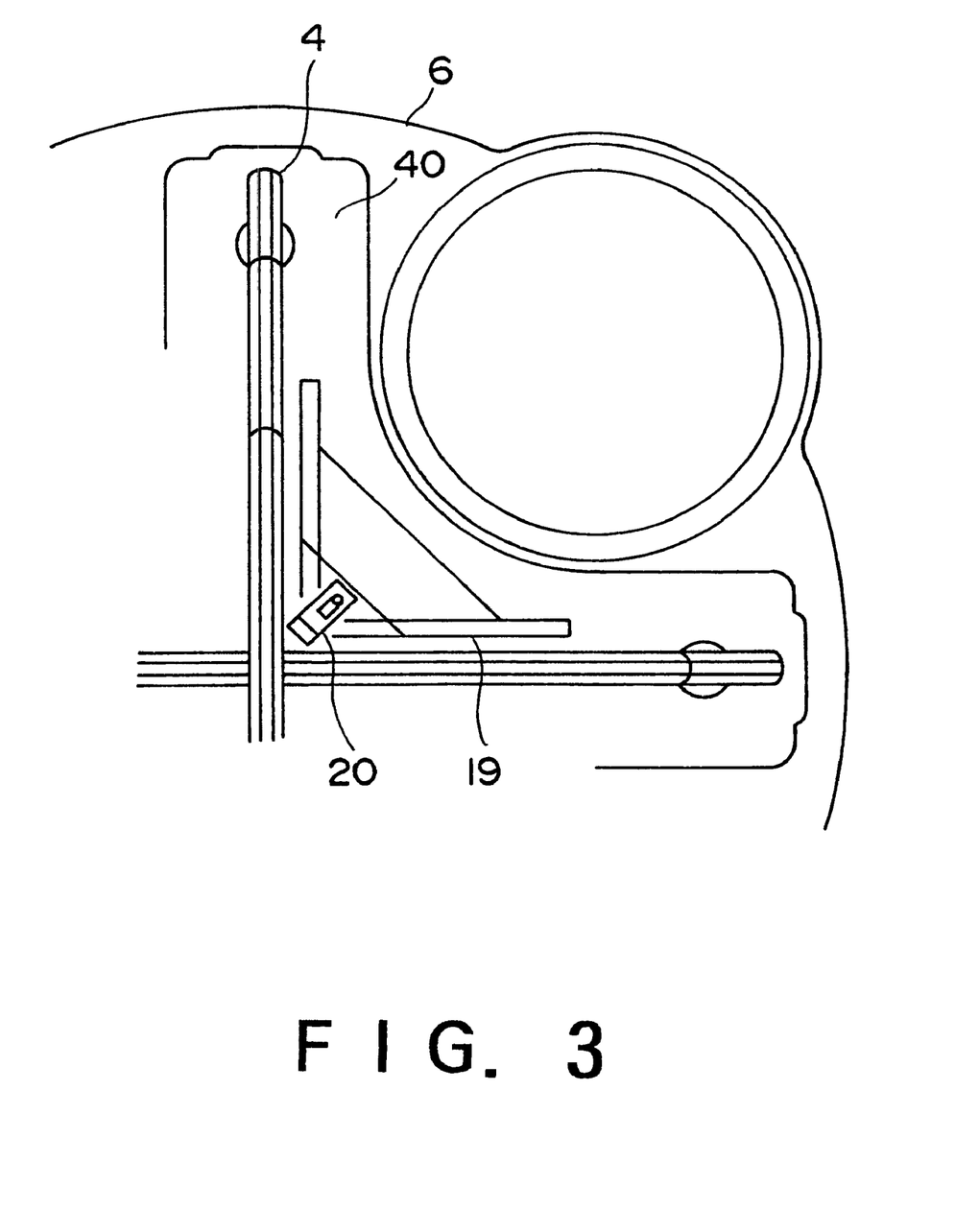
FIG. 3 is a plan view showing a state where an arm of the CR/FS grapple according to the embodiment of the present invention is inserted into a clearance between the control rod and the fuel support.

Also, an arm 19 is provided to extend along the actuating rod 21. The arm 19 is also provided such that it can be moved vertically relative to the separating frame 18. As shown in FIG. 3, during the exchange operation of the control rod 4, the arm 19 is inserted into a clearance between the control rod 4 and the cruciform through hole 4a of the fuel support 6 from the upper side.

A coupling releasing means 60, which can uncouple the control rod 4 and the control rod drive mechanism 8 by virtue of a spud coupling, is composed of the coupling releasing link mechanism 20, the actuating rod 21, the coupling releasing air cylinder 22.

As shown in FIG. 2, a damper mechanism 30 is provided to a top end of the air cylinder 22 to apply resistance to a piston rod 22a of the coupling releasing air cylinder 22 in its operation. The damper mechanism 30 constitutes an operational timing control mechanism which can uncouple the control rod 4 and control rod drive mechanism 8 by using the coupling releasing means 60 after the control rod holding means 50 has held the hoist handle 4d (see FIG. 8). A damper drive axis 30a of the damper mechanism 30 is connected to the piston rod 22a of the air cylinder 22.

Figures 4A, 4B, 4C:
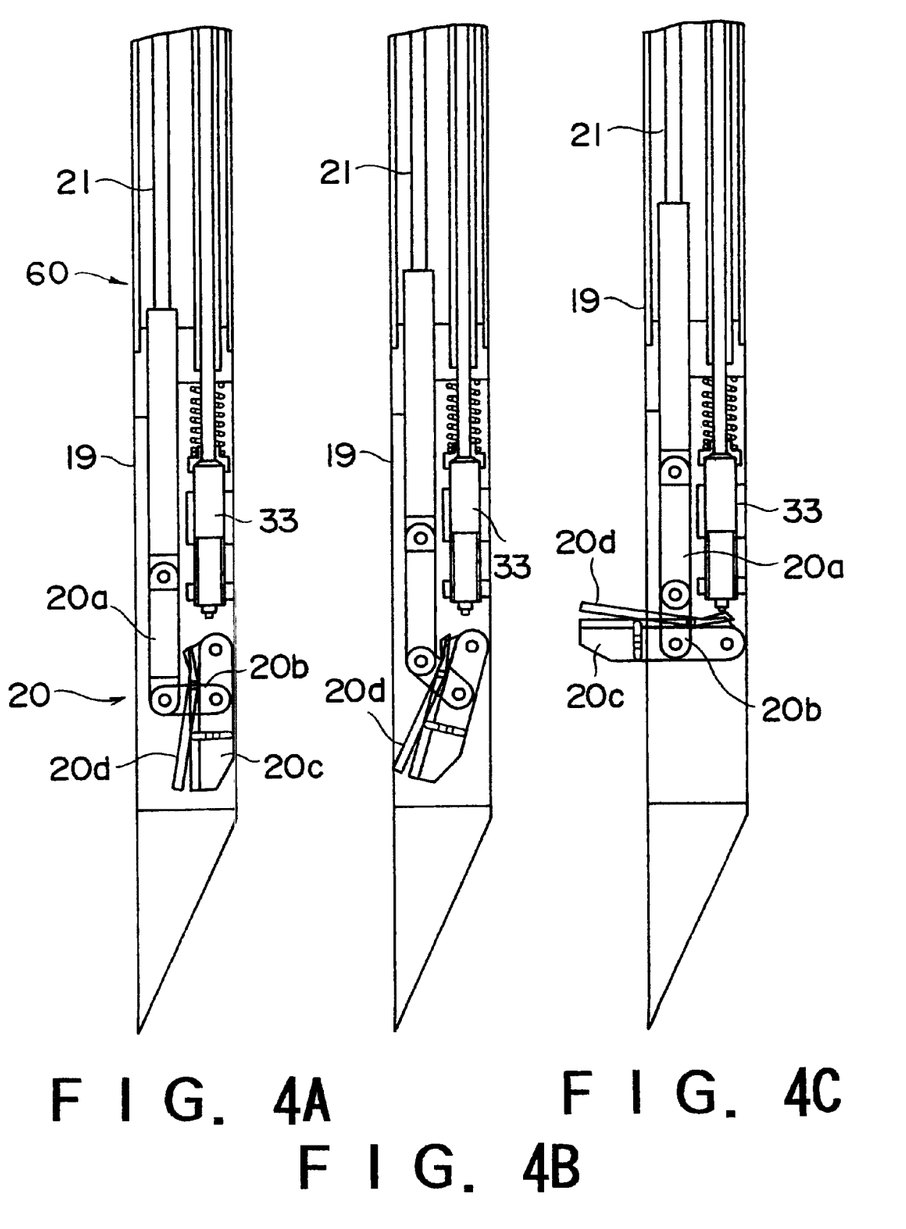
FIG. 4A is a view showing an operation of an uncoupling means n the CR/FS grapple according to the embodiment of the present invention, i.e., showing a first stage of the operation.
FIG. 4B is a view showing the operation of the uncoupling means in the CR/FS grapple according to the embodiment of the present invention, i.e., showing a second stage of the operation.
FIG. 4C is a view showing the operation of the uncoupling means in the CR/FS grapple according to the embodiment of the present invention, i.e., showing a third stage of the operation.

FIG. 4A, FIG. 4B, and FIG. 4C show an operation of the coupling releasing link mechanism 20 in the CR/FS grapple. As shown in FIG. 4A, FIG. 4B, and FIG. 4C, the coupling releasing link mechanism 20 includes a first arm 20a, a second arm 20b, and a third arm 20c.

A top end of the first arm 20a is pivotally coupled to a bottom end of the actuating rod 21, a bottom end of the first arm 20a is pivotally coupled to one end of the second arm 20b, and the other end of the second arm 20b is pivotally coupled to a middle portion of the third arm 20c.

In addition, one end of the third arm 20c is pivotally coupled to the arm 19. As shown in FIG. 4A, FIG. 4B, and FIG. 4C in sequence, when the piston rod 22a is lifted upward by driving the air cylinder 22, the first arm 20a and the second arm 20b can be pulled up and also the third arm 20c can be pulled up until a horizontal position while being pivoted.

Further, a bend-shaped switching member 20d is swingably and pivotally coupled to the third arm 20c. A limit switch 33 is provided over the switching member 20d. The limit switch 33 is electrically connected to an indicator lamp 29 shown in FIG. 1. On/off states of the limit switch 33 can be displayed by the indicator lamp 29.

As shown in FIG. 1 and FIG. 2, a pair of fuel support holding plungers 25 are provided on a bottom surface of the main body frame 24. A pair of fuel support holding air cylinders 26 for driving these holding plungers 25 are provided on the fuel support holding plungers 25. Limit switches 27 are provided in the neighborhood of the air cylinders 26 respectively. Operation states of the air cylinders 26 can be detected by the limit switches 27 and then detected results can be displayed by the indicator lamp 29.

Then, a fuel support holding means 70 which can hold the fuel support 6 (see FIG. 11) is composed of the fuel support holding plungers 25 and the fuel support holding air cylinders 26.

Figure 5:
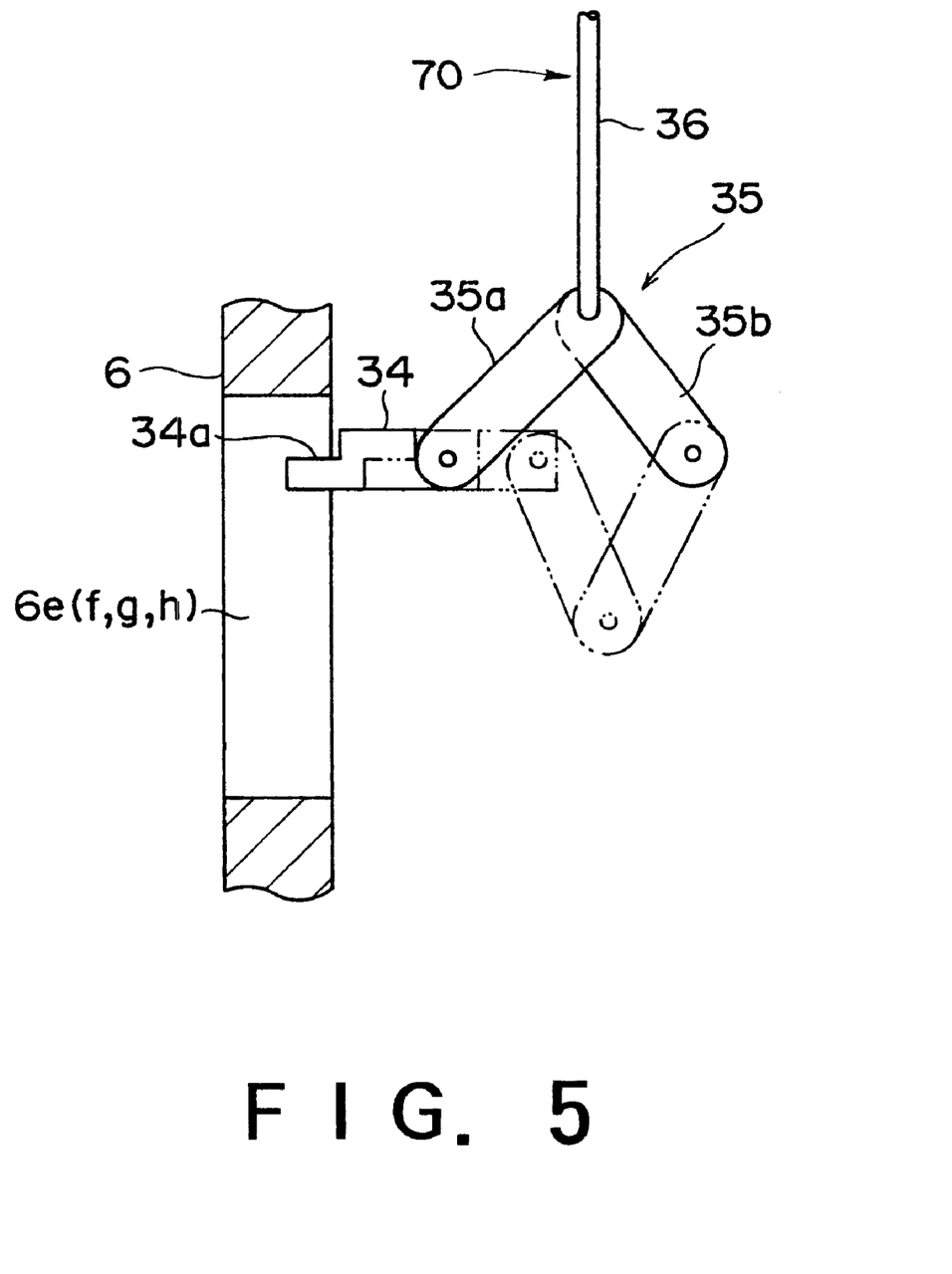
FIG. 5 is a schematic view showing an operation of a fuel support holding means in the CR/FS grapple according to the embodiment of the present invention.

The fuel support holding plungers 25 have contact pieces 34 respectively. As shown in FIG. 5, the contact pieces 34 can be moved back and forth by a fuel support holding link mechanism 35. A pair of contact pieces 34 are arranged at positions corresponding to a pair of opposing orifices 6e (f, g, h) of the fuel support 6 shown in FIG. 11. Stepped portions 34a on which the upper portions of the orifices 6e (f, g, h) are placed are formed on the contact pieces 34 respectively.

The fuel support holding link mechanism 35 has a first arm 35a and a second arm 35b. One end of the first arm 35a is pivotally coupled to a rear end of the contact piece 34, and the other end of the first end 35a is pivotally coupled to one end of the second arm 35b, and the other end of the second arm 35b is pivotally coupled to outer peripheral wall 25a (see FIG. 1) of the fuel support holding plunger 25. In addition, a bottom end of the actuating rod 36 which is coupled to the piston rod of the air cylinder 26 is pivotally coupled to a pivotable portion between the first arm 35a and the second arm 35b.

Figure 6:
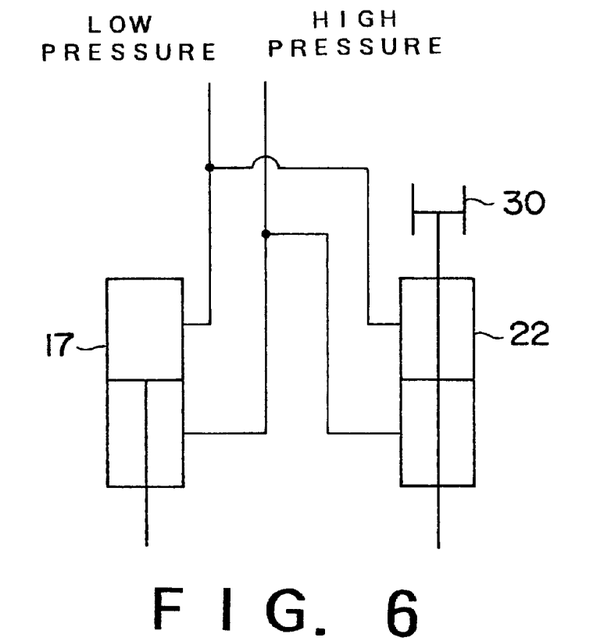
FIG. 6 is a schematic system diagram showing a piping system for supplying a working air to a control rod holding air cylinder and an uncoupling air cylinder in the CR/FS grapple according to the embodiment of the present invention.

FIG. 6 is a schematic system diagram showing a piping system for supplying a working air to a control rod holding air cylinder 17 and a coupling releasing air cylinder 22 in the CR/FS grapple. As can be seen from FIG. 6, the control rod holding air cylinder 17 and the coupling releasing air cylinder 22 employ commonly a set of low and high pressure working air sources.

In general, the working air sources which can be employed in the nuclear power plant consist of two sets of low and high pressure working air sources. Hence, a set of working air sources are commonly used for the control rod holding air cylinder 17 and the coupling releasing air cylinder 22, while a set of remaining working air sources can be used to operate the fuel support holding air cylinders 26. Therefore, there is no case where the site has lack of the working air sources.

Figure 7:
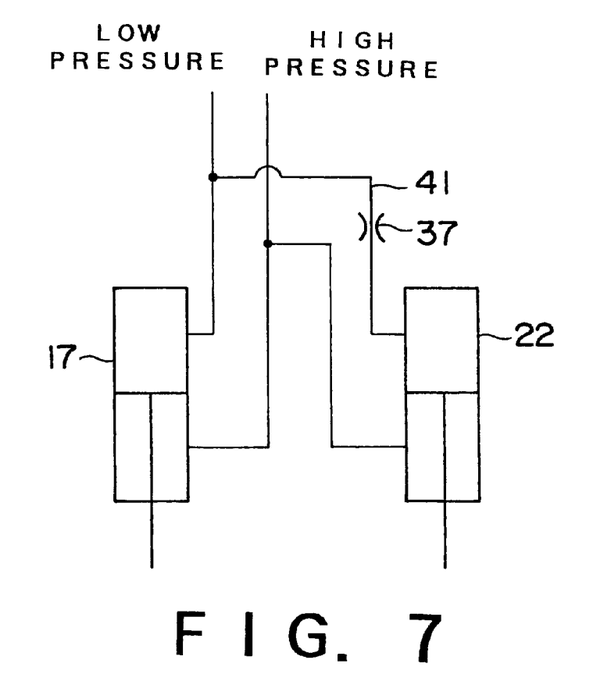
FIG. 7 is a schematic system diagram showing a modification in which a flow restrict mechanism is provided in place of a damper mechanism as an operational timing control mechanism in the CR/FS grapple according to the embodiment of the present invention.

FIG. 7 shows a modification in which a flow restrict mechanism 37 is provided in place of the damper mechanism 30 as an operational timing control mechanism in the CR/FS grapple. In this modification, a flow restrict mechanism 37 is provided in the middle of a low pressure side working fluid pipe 41 connected to the coupling releasing air cylinder 22.

Next, referring to FIGS. 1 and 8, when the control rods 4 and the fuel support 6 are picked up from the inside of the water-filled reactor pressure vessel 1, operations performed during the periodical inspection of the BWR by using the CR/FS grapple according to the present embodiment will be explained.

At the time when the lifting operation of the control rods 4 and the fuel support 6 is to be carried out, the fuel assemblies 3 fitted in predetermined grids have already been taken out from the inside of the reactor pressure vessel 1 by the refueling machine, etc. and the control rods 4 have been descended to their full pull-out states.

At first, a hoist rope wound on an auxiliary hoist, etc. of the refueling machine (not shown) is connected to the stud 14 of the CR/FS grapple, and then the CR/FS grapple is hung down inside of the reactor pressure vessel 1 to be inserted into the preselected grid. Thus, the separating frame 18 and the main body frame 24 are seated on the control rod 4 and the fuel support 6 respectively.

Then, a compressed air is supplied from an air system (working air source) of the refueling machine to the control rod holding air cylinder 17, the coupling releasing air cylinder 22, and the fuel support holding air cylinders 26 respectively. At that time, since the operational timing control mechanism composed of the damper mechanism 30 or the flow restrict mechanism 37 is provided to the coupling releasing air cylinder 22, movement of the coupling releasing air cylinder 22 is delayed relative to that of the control rod holding air cylinder 17 in operation.

Therefore, at first the hook 16 of the control rod holding means 50 holds the hoist handle 4d of the control rod 4 and then the third arm 20c of the coupling releasing link mechanism 20 of the coupling releasing means 60 pulls up the release handle 4e of the control rod 4, whereby the coupled state of the control rod 4 and the control rod drive mechanism 8 by using the spud coupling can be released.

Like the above, since the operational timing control mechanism is provided, a holding operation of the control rod 4 can be effected by the control rod holding means 50 before the coupled state is released by the coupling releasing means 60. Since the time difference in the operations of the control rod holding air cylinder 17 and the coupling releasing air cylinder 22 is caused by the operational timing control mechanism composed of the damper mechanism 30 or the flow restrict mechanism 37, a time difference can be generated in their respective operations even though the common working air source is employed for the control rod holding air cylinder 17 and the coupling releasing air cylinder 22. In addition, since the common working air source is employed for both air cylinders 17, 22, a time difference can be caused without fail in their operation even when a pressure of the supplied air from the working air source is varied.

The operation when the hoist handle 4d of the control rod 4 is held by the control rod holding means 50 will be explained hereunder.

After the separating frame 18 is seated on the control rod 4, the piston rod 17a is drawn in by driving the control rod holding air cylinder 17 to pivot the hook 16 such that the hook 16 is shifted to the hooked position shown in FIG. 1.

At that time, an operation state of the control rod holding air cylinder 17 can be detected by the limit switch 51 and then the detection result can be displayed on the indicator lamp 29. Accordingly, the operator can check by eye whether or not the hook 16 is located in its hooking position.

Next, when the stud 14 is lifted by winding the hoist rope of the auxiliary hoist in this state, only the control rod holding means 50 which consists of the hook 16, the control rod holding air cylinder 17, and the square cylinder member 15 can be lifted up together with the stud 14 while the separating frame 18 is still seated on the control rod 4. Then, the hook 16 grasps the hoist handle 4d of the control rod 4 and lifts it. At that time, it can be detected by sensing a weight applied to the hoist rope whether or not the hook 16 of the control rod holding means 50 has held the hoist handle 4d of the control rod 4.

In this way, prior to lifting-up of an entire CR/FS grapple, it can be checked or confirmed whether the control rod 4 is held by the control rod holding means 50, or not. Also, under the condition that the hoist handle 4d is grasped and then lifted up by the hook 16, a hooked state by the hook 4 can be held by a self-weight of the control rod 4 since the hook 16 is formed like a hook-shape. As a result, the control rod 4 is prevented from dropping down and also safety can be maintained even if either supply of the compressed air to the control rod holding air cylinder 17 has been lost or operations have been performed wrong.

Subsequently, an operation performed when the coupled state of the control rod 4 and the control rod drive mechanism 8 by the spud coupling is released by the coupling releasing means 60 will be explained hereunder.

First of all, when the piston rod 22a is lifted up by driving the coupling releasing air cylinder 22, the first arm 20a and the second arm 20b can be pulled up and also the third arm 20c can be pulled up to its horizontal position while it is being pivoted, as shown in FIG. 4A, FIG. 4B, and FIG. 4C in order.

Next, the overall coupling releasing link mechanism 20 as well as the arm 19 can be lifted up by rising up the piston rod 22a further from the state shown in FIG. 4C. Then, the release handle 4e of the control rod 4 can be pulled up by the third arm 20c, so that the coupling of the control rod 4 and the control rod drive mechanism 8 can be released. In addition, the switching member 20d can be pivoted when the third arm 20c is engaging with the release handle 4e and thus the limit switch 33 can be pushed up by one end of the switching member 20d. Then, the limit switch 33 is operated to switch its on/off state and as a result the displaying state of the indicator lamp 29 is changed, whereby the operator can check or confirm by eye that the release handle 4e of the control rod 4 has been actuated.

Operations effected when the fuel support 6 is held by the fuel support holding means 70 are explained hereinbelow.

Prior to starting the holding operation of the fuel support 6, the contact pieces 34 and the fuel support holding link mechanism 35 are positioned at locations shown by chain double-dashed lines in FIG. 5. The actuating rod 36 is moved upward from this location by driving the fuel support holding air cylinders 26. Thus, the contact pieces 34 are caused to advance to the orifices 6e (f, g, h) of the fuel support 6 and thus advance further more than the position indicated by solid lines in FIG. 5.

Forward movements of the contact pieces 34 are continued until the first arm 35a and the second arm 35b are positioned from their downward-convex alignment to their linear alignment, and then the contact pieces 34 are switched to their backward movements when the first arm 35a and the second arm 35b are shifted from their linear alignment to their upward-convex alignment. Then, at the time point when the piston rods of the fuel support holding air cylinders 26 and the actuating rod 36 reach their upper limit positions of lifting strokes, the backward movements of the contact pieces 34 are stopped and therefore the contact pieces 34 are positioned, as shown by the solid lines in FIG. 5.

At this time, operation states of the fuel support holding air cylinders 26 can be detected by the limit switches 27 and the detected results can then be displayed by the indicator lamps 29 respectively. Accordingly, the operator can check or confirm by eye whether or not the contact pieces 34 are in their held positions.

Then, in the situation indicated by the solid lines in FIG. 5, when the CR/FS grapple is pulled up by winding up the hoist rope of the auxiliary hoist, the upper portions of the orifices 6e (f, g, h) of the fuel support 6 are put on the stepped portions 34a of the contact pieces 34 so that the CR/FS grapple as well as the fuel support 6 can be pulled up together.

Since both forward and backward movements of the contact pieces 34 can be prevented in the situation that the upper portions of the orifices 6e (f, g, h) of the fuel support 6 are put on the stepped portions 34a of the contact pieces 34, the fuel support 6 can be prevented from dropping down to thus maintain safety even if either supply of the compressed air to the control rod holding air cylinder 17 has been lost at the worst or wrong operations have been effected.

As described above, the CR/FS grapple can be lifted upward after the control rods 4 have been held by the control rod holding means 50 and also the fuel support 6 has been held by the fuel support holding means 70, so that the control rods 4 and the fuel support 6 can be lifted up simultaneously and carried out together from the reactor pressure vessel 1.

The CR/FS grapple according to the embodiment of the present invention may be employed when the control rods 4 and the fuel support 6 are carried into the inside of the reactor pressure vessel 1 and then installed therein. In this case, the control rods 4 and the fuel support 6 maybe lifted up and installed simultaneously.

In the CR/FS grapple according to the embodiment of the present invention, since the separating frame 18 may be detached from the main body frame 24 by releasing the fitting bolts 31 (see FIG. 2), the fuel support holding means 70 and an assembly consisting of the control rod holding means 50 and the coupling releasing means 60 can be employed independently respectively as separate bodies.

As a consequence, in a case that the control rods 4 cannot be pulled out until their full pull-out states due to a failure of the control rod drive mechanism 8, at first only the fuel support 6 can be lifted up by using the fuel support holding means 70 to be picked out from the reactor pressure vessel 1, and then the control rods 4 are hoisted by the control rod holding means 50 and the coupling releasing means 60 to be taken out from the reactor pressure vessel 1.

As described above, according to the CR/FS grapple of the embodiment of the present invention, since both the control rods 4 and the fuel support 6 can be held by the control rod holding means 50 and the fuel support holding means 70 and also the coupled state of the control rods 4 and the control rod drive mechanism 8 by using the spud coupling can be released by the coupling releasing means 60, there is no necessity of executing the coupling releasing operation from the pedestal side of the bottom of the reactor, unlike the aforesaid related art. Therefore, an efficiency of the exchange operation of the control rods 4 can be improved by reducing the term of the periodical inspection and the exposure of the operator.

More particularly, in contrast to the prior operation, it is possible to reduce the operation time by about thirty minutes per control rod 4. The typical operation time of the prior operation was about 55 minutes per control rod 4. Therefore, about 55% of the operation time can be reduced by using the present CR/FS grapple.

What is claimed is:

1. A control rod/fuel support grapple comprising:
   a control rod holding mechanism adapted to hold a hoist handle provided at a top end of a control rod comprising a pivotable hook adapted to be hooked onto said hoist handle, and means for pivoting said pivotable hook actuated by a working fluid from a source provided to the grapple by a single fluid connection;

a fuel support holding mechanism adapted to hold a fuel support which supports a bottom end of a fuel assembly;

a coupling releasing mechanism adapted to uncouple said control rod from a control rod drive mechanism coupled by a spud coupling, said coupling releasing mechanism comprising a pivotable lever adapted to lift a release handle on said control rod, and means for pivoting said lever when actuated by said working fluid from said source so that when actuated by said working fluid said lever is pivoted causing it to lift said release handle, said coupling releasing mechanism comprising an L-shaped arm dimensioned so that it can be inserted into a clearance between said control rod and said fuel support and positioned away from said fuel support holding mechanism such that said coupling releasing mechanism can lift said release handle when said control rod is descended to a full pull-out state;

a main body frame to which said control rod holding mechanism, said fuel support holding mechanism, and said coupling releasing mechanism are attached, said main body frame adapted so that said control rod holding mechanism, said fuel support holding mechanism, said coupling releasing mechanism and said main body frame may be inserted into a reactor pressure vessel as an integral unit; and means for delaying actuation of said coupling releasing mechanism such that said coupling releasing mechanism fully actuates after said control rod holding mechanism hooks onto said control rod when said working fluid is provided from said source simultaneously to said coupling releasing mechanism and said control rod holding mechanism.

2. A control rod/fuel support grapple according to claim 1, wherein said coupling releasing mechanism further comprises a coupling releasing link mechanism adapted to operate said release handle of said control rod, and a coupling releasing cylinder adapted to drive said coupling releasing link mechanism.

3. A control rod/fuel support grapple according to claim 1, wherein the control rod holding mechanism can be is placed relative to the main body frame along a longitudinal direction of the control rod by a predetermined width.

4. A control rod/fuel support grapple according to claim 2, wherein said means for delaying actuation after comprises a damper mechanism for applying resistance to a piston rod of said coupling releasing cylinder in its operation.

5. A control rod/fuel support grapple according to claim 2, wherein said means for delaying actuation further comprises a flow restrict mechanism which is provided in a working fluid pipe connected to said coupling releasing cylinder.

6. A control rod/fuel support grapple according to claim 1, wherein said pivotable hook is formed of a hook-shaped member, and the weight of said control rod maintains a hooked state of said hoist handle by said pivotable hook after said control rod has been lifted up via said pivotable hook.

7. A control rod/fuel support grapple according to claim 1, wherein said fuel support holding mechanism comprises a fuel support holding link mechanism adapted to hold a top end of an orifice of said fuel support, and a fuel support holding cylinder adapted to drive said fuel support holding link mechanism.

8. A control rod/fuel support grapple according to claim 7, wherein said fuel support holding link mechanism comprises a moveable contact piece, said contact piece adapted for contacting an upper portion of said orifice, said contact piece comprising a stepped portion and wherein said contact piece can be positioned such that said upper portion of said orifice contacts said stepped portion of said contact piece when said control rod/fuel support grapple is raised.

9. A control rod/fuel support grapple according to claim 1, further comprising detecting means for checking a holding state of said control rod holding mechanism, a holding state of said fuel support holding mechanism, and a releasing state of the coupling releasing mechanism respectively.

10. A control rod/fuel support grapple according to claim 1, wherein said control rod holding mechanism and said coupling releasing mechanism are detachably attached to said main body frame, said fuel support holding mechanism and both said control rod holding mechanism and said coupling releasing mechanism can be employed independently respectively as separate bodies by detaching said control rod holding mechanism and the coupling releasing mechanism from said main body frame.

11. A control rod/fuel support grapple comprising:

means for holding a top end of a control rod actuated by air from a source provided to the grapple by a single air connection;

a fuel support holding mechanism adapted to hold a fuel support which supports a bottom end of a fuel assembly;

a coupling releasing link mechanism for uncoupling a control rod and a control rod drive mechanism coupled by a spud coupling mechanism, said coupling releasing mechanism comprising a spud coupling releasing mechanism adapted to operate a control rod release handle, said spud coupling releasing mechanism comprising a pivoting lever dimensioned so that it can be inserted into a clearance between said control rod and said fuel support and positioned away from said fuel support holding mechanism so that said coupling releasing link mechanism can operate said control rod release handle when said control rod is descended to a full pull-out state;

a main body frame, comprising fitting bolts and a separating frame, to which said means for holding a top end of a control rod, said fuel support holding mechanism, and said coupling releasing link mechanism are attached, said main body frame adapted so that said means for holding a top end of a control rod, said fuel support holding mechanism, said coupling releasing link mechanism and said main body frame may be inserted into a reactor pressure vessel as an integral unit, wherein said separating frame is detachable from said main body frame by releasing said fitting bolts such that said fuel support holding means can be removed from said reactor pressure vessel separate from an assembly comprising said coupling releasing link mechanism and said means for holding a top end of a control rod;

a coupling releasing cylinder adapted to drive said coupling releasing link mechanism, said coupling releasing cylinder actuated by air from said source; and an operational timing control mechanism adapted to delay actuation of said coupling releasing link mechanism until after said means for holding a top end of a control rod is fully actuated when air is provided from said source simultaneously to said coupling releasing cylinder and said means for holding a top end of a control rod, wherein said fuel support holding mechanism includes a fuel support holding cylinder and a contact piece that has a stepped portion, said contact piece being capable of being inserted into an orifice of said fuel support by a link mechanism such that an upper surface of said orifice is aligned with said stepped portion of said contact piece and said upper surface of said orifice is placed in contact with said stepped portion when said control rod/fuel support grapple is raised, said contact piece being arranged at a position corresponding to said orifice when said main body frame is inserted into a reactor pressure vessel.

12. A control rod/fuel support grapple comprising:

a main body frame;

a separating frame connectable to said main body frame;

means for holding a hoist handle provided at a top end of a control rod, said means for holding a hoist handle connected to said separating frame;

means for holding a fuel support which supports a bottom end of a fuel assembly, said means for holding a fuel support connected to said main body frame; and a coupling releasing mechanism attached to said separating frame via a vertical arm and adapted to uncouple a control rod and a control rod drive mechanism coupled by a spud coupling mechanism, said vertical arm comprising an L-shaped arm dimensioned so that it can be inserted into a clearance between said control rod and said fuel support and positioned away from said means for holding a fuel support so that said coupling releasing mechanism can release said spud coupling mechanism when said control rod is descended to a full pull-out state, wherein said separating frame and said main body frame are adapted such that when said separating frame is connected to said main body frame, said means for holding a hoist handle, said means for holding a fuel support, and said coupling releasing mechanism form an integral unit.

13. A control rod/fuel support grapple comprising:

means for holding a hoist handle provided at a top end of a control rod;

means for holding a fuel support which supports a bottom end of a fuel assembly;

means for uncoupling a control rod and a control rod drive mechanism coupled by a spud coupling mechanism, wherein said means for uncoupling a control rod comprises a spud coupling releasing mechanism that engages a control rod release handle on said control rod and thereby uncouples said spud coupling mechanism, said spud coupling releasing mechanism comprising an L-shaped arm dimensioned so that it can be inserted into a clearance between said control rod and said fuel support and positioned away from said means for holding a fuel support such that said spud coupling releasing mechanism can operate said control rod release handle when said control rod is descended to a full pull-out state; and a main body frame to which said means for holding a hoist handle, said means for holding a fuel support, and said means for uncoupling a control rod are attached.

\* \* \* \* \*